Oct. 6, 1970
J. P. NAUTA
3,531,828
APPARATUS FOR MAKING SYNTHETIC PLASTIC SHEET
MATERIAL WITH COLOR PATTERN
Filed Jan. 3, 1967
3 Sheets-Sheet 1
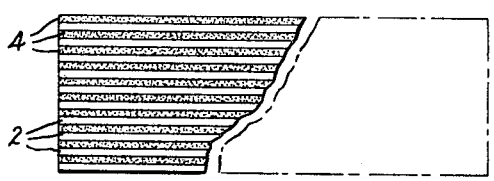
FIG. 1
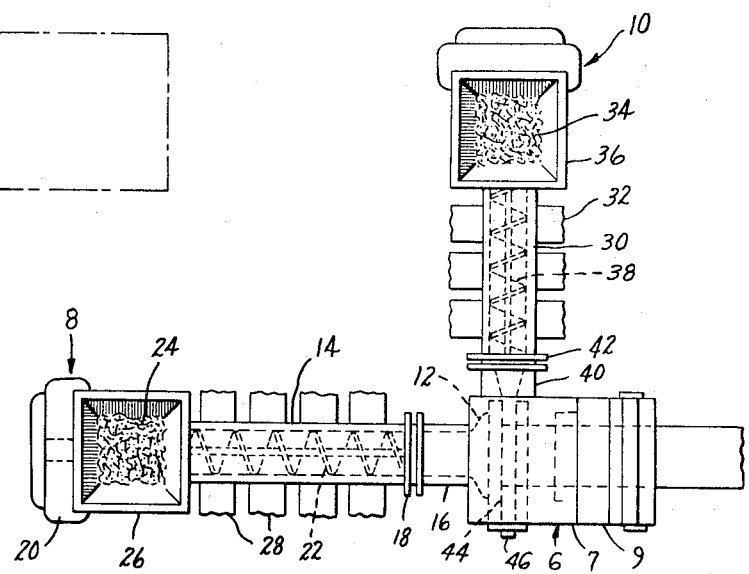
FIG. 2
FIG. 4
FIG. 5
FIG. 6
FIG. 3
INVENTOR
JAN P. NAUTA
BY
ATTORNEY Oct. 6, 1970     J. P. NAUTA     3,531,828
APPARATUS FOR MAKING SYNTHETIC PLASTIC SHEET
MATERIAL WITH COLOR PATTERN
Filed Jan. 3, 1967     3 Sheets-Sheet 2

INVENTOR
JAN P. NAUTA

BY Peter L. Coster
ATTORNEY

Oct. 6, 1970   J. P. NAUTA   3,531,828
APPARATUS FOR MAKING SYNTHETIC PLASTIC SHEET
MATERIAL WITH COLOR PATTERN
Filed Jan. 3, 1967   3 Sheets-Sheet 3
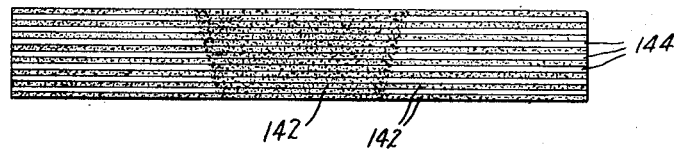
FIG. 20
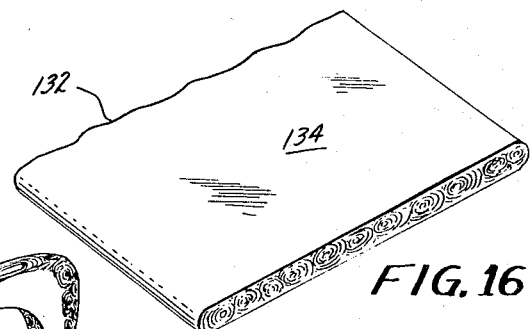
FIG. 16
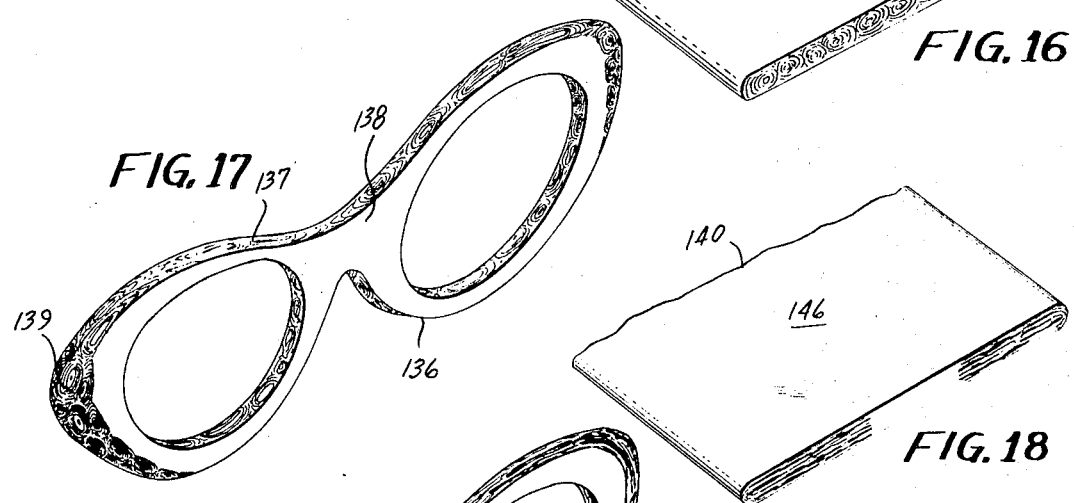
FIG. 17
FIG. 18
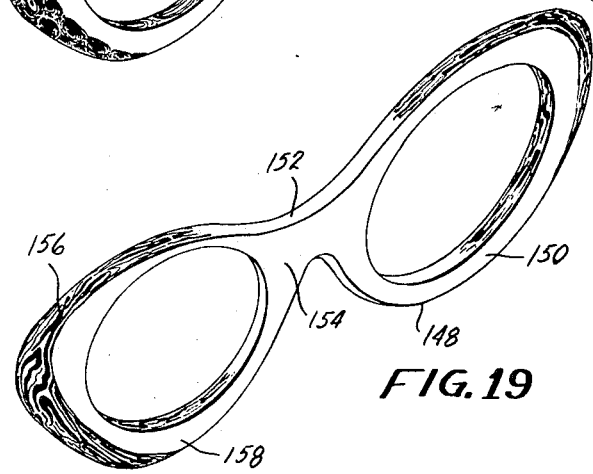
FIG. 19
INVENTOR
JAN P. NAUTA
BY
ATTORNEY United States Patent Office 3,531,828
Patented Oct. 6, 1970

3,531,828
APPARATUS FOR MAKING SYNTHETIC PLASTIC SHEET MATERIAL WITH COLOR PATTERN
Jan P. Nauta, West Hartford, Conn., assignor to Rowland Products, Incorporated, Kensington, Conn., a corporation of Connecticut
Filed Jan. 3, 1967, Ser. No. 606,811
Int. Cl. B29f 3/02
U.S. Cl. 18—13                                12 Claims

ABSTRACT OF THE DISCLOSURE

Nonrectilinear color bands are produced within the narrow dimension of the cross-section of extruded synthetic thermoplastic sheet material by an oscillating member in an extruder die block which intercepts and oscillates the point of discharge therefrom of at least a portion of a molten composite stream of a plurality of differentially colored layers of synthetic plastic in a direction normal to the layers. Thus, the bands of color are nonrectilinear in the length and depth dimensions of the sheet material and may also be made nonrectilinear in the width dimension of the sheet material by suitable apertures in the oscillating member. In addition, suitably configured exit apertures in the distribution member may vary the shape and size of the bands in the width dimension of the sheet material. By providing a diversion sleeve about the distribution member which is properly dimensioned with respect to the surrounding chamber, surface portions of the composite stream may be diverted around the distribution member to avoid disturbance thereof and to encapsulate the portion passing through the distribution member with its nonrectilinear bands. This enables the provision of monochromatic undisturbed surface layers or surface layers with undisturbed rectilinear differentially colored bands.

---

The present invention relates to the extrusion of synthetic plastic sheet material, and more particularly to novel extruded sheet material having nonrecilinear differentially colored bands therein in the length and depth dimensions of the sheet material and to the apparatus and process of making such extruded sheet material.

The provision of extruded sheet material with differentially colored layers, bands, or regions is often desirable, particularly for novel decorative effects. A highly effective apparatus and method for making one form of differentially colored material are described in U.S. Pat. No. 2,985,556, granted May 23, 1961, to William P. Rowland. In U.S. Pat. No. 3,274,646, granted Sept. 27, 1966, to Joseph P. Krystof, there is described a process and apparatus for producing differentially colored sheet material with undulating bands of color. More recently, it has been proposed to make synthetic plastic sheet material having a multiplicity of generally longitudinally extending layers of differentially colored material as described in my copending application Ser. No. 500,755, filed on Oct. 22, 1965.

The term "differentially colored material" as used herein is intended to encompass materials which are visually distinguishable from each other or a first color to provide a visual pattern effect. It includes materials containing coloring matter such as dyes and pigments and materials which are substantially transparent to provide distinct coloration. It also includes the use of streams of the same color which have distinct optical properties such as can be achieved by incorporation of optically modifying components such as aluminum flakes and fish scales, which produce variation in light refraction or transmission with resultant visual pattern effects.

Despite the great advantages and wide variety of patterns produced by the methods of the aforementioned patents and application, fashion designers have sought patterns which are less regular in appearance. In addition, there has been a desire to simulate wood grains and other nonrectilinear layered structures.

It is an object of the present invention to provide a novel and attractive synthetic plastic sheet material having nonrectilinear bands of differentially colored material within the narrow dimension of the sheet material.

It is also an object to provide a relatively simple, economical and highly efficacious method for extruding such synthetic plastic sheet material which is adapted to wide variation in pattern design.

Another object is to provide novel extrusion apparatus for conveniently and economically producing such differentially colored sheet material and which is adapted to wide variation in pattern design and relatively rugged and economical in construction.

Still another object is to provide a method and apparatus for making a sheet material which has such nonrectilinear differentially colored bands sandwiched between layers having substantially uniform coloration.

Summary of the invention

It has now been found that the foregoing and related objects and advantages may be readily attained in an extrusion die assembly having a die block with a first chamber and a second chamber communicating therewith through an intermediate orifice which has first and second dimensions. Within the first chamber is means for receiving a plurality of differentially colored streams of fluid synthetic thermoplastic material and for forming a composite stream of fluid synthetic thermoplastic material having a multiplicity of differentially colored layers disposed in planes which are substantially parallel to the first dimension of the orifice. The second chamber communicates with a discharge orifice for the die block to provide passage therethrough of a composite stream of fluid synthetic thermoplastic material received from the first chamber.

A distribution member is provided in the second chamber between the intermediate and discharge orifices and has a flow passage therethrough from adjacent the intermediate orifice to adjacent the discharge orifice to pass at least a portion of the composite streams therethrough. Suitable mounting means mount the distribution member for oscillatory motion in the direction of the second dimension of the intermediate orifice, and drive means is provided for oscillating the distribution member to displace portions of the composite stream of fluid synthetic material in a direction which is substantially perpendicular to the first dimension.

As a result, the layers of the differential colors are displaced into nonrectilinear bands in the direction of oscillation along the length and within the depth of the composite stream and in the sheet material. Thus, the differentially colored bands move up and down within the depth of the sheet material within the length of the sheet material. By proper selection of exit apertures in the distribution member, the bands may be varied in shape and size in the width dimension of the sheet material. In addition, a diversion sleeve or element may be used to divert surface portions of the composite stream around the distribution member to avoid disturbance thereof and encapsulate the portion passing through the distribution member with its nonrectilinear bands.

The construction of a main die block assembly for forming a multiplicity of layers of differentially colored material is described in detail in my aforementioned copending application. Generally, however, such a die block assembly has the first chamber, a first conduit for supplying a first stream of fluid synthetic thermoplastic material to the chamber at a first point spaced from the intermediate orifice and a second conduit for supplying a second stream of differentially colored fluid synthetic thermoplastic material to the chamber at a second point spaced from the first point and from the intermediate orifice with the conduits extending from surfaces other than that having the intermediate orifice.

A color distributing stack comprised of a multiplicity of spacer and flow elements is disposed within the first chamber and has a plurality of manifolds extending therethrough adjacent the end thereof spaced from the intermediate orifice. Various of the manifolds communicate with one of the conduits and others communicate with the other conduit so as to provide flow of material from both of the conduits through the manifolds. The flow elements have at least one aperture or flow path therein extending from one of the manifolds to the other end of the stack adjacent the intermediate orifice to provide for flow therethrough, and at least two flow elements have overlying apertures extending from manifolds communicating with differing conduits so as to provide superposed flow of thermoplastic material from both of the conduits in at least a portion of the stack. A spacer element separates the two flow elements from the manifolds for at least a portion of the distance to the end of the stack adjacent the intermediate orifice after which the superposed flowing materials from the two conduits may combine to produce a synthetic plastic composite stream having differentially colored layers in at least a portion of the width thereof.

It will be appreciated that more than two differentially colored synthetic plastic materials may be employed in accordance with the present invention by providing additional conduits and manifolds connected to the various conduits. In such a method and apparatus, various apertures in the flow elements communicate with the manifolds for the several colors and are so configured as to provide overlying flow of streams of differentially colored thermoplastic material from the various conduits in any desired arrangement. In accordance with one aspect of the invention, the flow from each of the conduits may be provided to the depth of the combined stream at a portion of the width thereof or various combinations of the several colors may be so combined to provide the full depth of any one point. In addition, layers containing more than one color may be formed by having the apertures in the flow elements configured to provide side-by-side flow of streams of molten thermoplastic material from more than one conduit. In this manner, various patterns of the differentially colored material through the depth and width of the sheet may be obtained.

It will be appreciated that the number of layers of differentially colored material may be varied widely. Although as few as three layers will provide the differentially colored regions achieved by the present invention, generally it is desirable to provide four to ten layers. As many as twenty, and even more, layers may be provided depending upon the thickness of the material formed, but factors of fluid dynamics in thin stream layers must be considered in determining the number of layers that may be employed for a given thickness of material.

After formation in the first chamber, hte multilayered stream of molten material passes into the second chamber through the intermediate orifice. This orifice is generally reduced in cross-section from that of the chamber, to compact and orient the layers although it may merely be a portion of a single large chamber providing both first and second chambers as well as the intermediate orifice which may merely be a passage portion.

However, the second chamber is preferably distinct and ideally has a circular cross-section chamber. Since the distribution member must be capable of oscillatory motion in the direction of the second dimension of the intermediate orifice between the first and second chambers, it is most advantageously a cylindrically shaped rotor capable of at least partial rotation in the chamber. However, it is also possible to employ distribution members having other shapes such as, for example, a rectangular plate which is mounted for linear movement. Preferably, the distribution member is designed so that it can be quickly and easily removed and replaced with a second or modified member to allow modification of design in the plastic material being extruded with the same multilayered molten stream.

The passage which is provided in the distribution member can be of any shape which will allow the passage of the composite stream and will also afford the necessary structural strength to the member. When the distribution member employed is of the rotor-type a highly desirable configuration for the passage therethrough has been found to be one which is, in cross-section, generally funnel-shaped with the opening at the entrance side of the passage being widest and tapering to a narrower passage, with parallel sides leading to the discharged end. It is generally undesirable to provide a passage in the distribution member which has a complex configuration since it may tend to mix the colors and to produce a monochromatic blend rather than a material having discrete differentially colored bands.

The passage in the distribution member terminates at the downstream or exit end thereof and the exit surface is referred to as the die face since it affects the pattern formed by both the shape of the exit end of the passage and the oscillation thereof. Although the die face or discharge end of the passage may be machined or cast into the distribution member to provide an integral structure, most desirably a die insert is utilized which is removably mounted in the body of the distribution member to facilitate change in shape or size and thus the designs produced.

The die which is employed may have an irregularly shaped aperture so that the profile of the composite stream is subjected to the combined effect of not only the oscillatory motion but also distortion as a result of the die aperture, thus resulting in designs in the extruded material which are exceptionally striking. By altering the profile of the composite stream under the compound influences of the die face and the oscillating movement, a sheet of synthetic thermoplastic material is fabricated wherein the bands or layers of colors in the composite stream are displaced in the direction of oscillation with respect to the profile of the previous increment of the composite stream.

The apertures in the die face may have numerous configurations, and the present invention is not intended to be limited to the utilization of any particular type of aperture. One particularly beneficial shape for the aperture is a serrated or saw-tooth configuration. Variations on this configuration leading to interesting modifications are provided by variation of the size or slope of the teeth. Very interesting patterns are also achieved when a multiplicity of apertures are provided in the die face. These apertures may be variously shaped, e.g., round, oval, triangular, square, etc., and the number of such apertures employed and their relative positions may be varied so as to achieve different designs. It will be appreciated that many other types of apertures may be utilized to achieve desirable effects, and that combinations and additional modifications are also feasible.

Although the entire depth of the composite stream may pass through the oscillating distribution member, this will generally produce smearing of the outer layers to form a mottled color formed by the component colors in the several layers. Where such is formed and it is desired to obtain the more vivid patterns, surface portions of the resultant sheet material may be removed.

However, this problem can be avoided by use of a diversion sleeve within the second chamber which rotatably receives the distribution member and provides a flow passage therethrough. By providing a spacing between the sleeve and the surface of the die block defining the chamber, the outer portion of the composite stream may be caused to flow thereabout rather than therethrough and thereby through the distribution member. Although this spacing may be provided only above or only below the sleeve, desirably there is spacing both above and below so that the portion flowing through the sleeve and distribution member will be encapsulated by laminar portions flowing around it both above and below.

Accordingly, the diversion sleeve is cooperatively dimensioned with respect to the distribution member and chamber and has inlet and outlet ends of a passage therethrough positioned in general alignment with those orifices provided in the second chamber. However, the inlet opening of the sleeve passage will generally be somewhat smaller than the intermediate or inlet orifice so as to facilitate diversion of one or both outer portions of the composite stream entering the second chamber around the outside surface of the sleeve in the path provided between the sleeve and chamber wall surface. After passing about the sleeve, these diverted portions rejoin and encapsulate the body portion of the stream which passes through the distribution member to form a composite stream with monochromatic or undisturbed outer surface layers and a body portion with non-rectilinear bands of differently colored material.

By having the flow passage discharge or die face terminate inwardly from the ends of the chamber, the layers flowing about the sleeve will also flow to the sides of the portion passing through the distribution member and provide monochromatic or undisturbed coloration thereat. Thus, monochromatic or undisturbed linear patterns can be provided in the exterior surfaces of the sheet material, and the novel and highly attractive swirl and non-rectilinear bands can be exposed by removing the surface portions of the sheet either along a plane parallel thereto or more desirably at an angle thereto to obtain the full impact of the oscillation in the direction of the several layers. This is highly effective in spectacle frames wherein the front surface may be the monochromatic outer layer and the various side surfaces are more or less bevelled to expose the interior multicolored pattern.

The sheet material of the present invention can be formed with a myriad of distinctive patterns by varying any of a number of parameters or combinations thereof. For example, the design of the layers formed in the first chamber can be varied such as by employing layers of more than two colors. Other possibilities include varying the relationships of the colors, making the layers of unequal depth or unequal width, providing bands of a single color perpendicular to the layers by spacing the multicolored layers apart by a single color portion, etc. Reference to the copending application of Jan P. Nauta will provide further indication of the numerous variations which can be achieved in the first chamber.

After emerging from the first chamber the layered material may be manipulated in numerous ways in the second chamber to produce a wide range of effects. Thus, as was mentioned above, the shape of the aperture or apertures in the die face may take any of many suitable forms to produce variations in the extruded product. The number of apertures and relative positions thereof can also be varied to give different patterns. Utilization of different drive means will also result in altered effects in the differentially colored regions.

Oscillating the distribution member at slower or faster speeds with respect to the rate of extrusion of the plastic will vary the configuration of the colored regions. The drive means may be rotary and include a crank and rod-type linkage, which will result in a sinusoidal variation from linear movement of material passing through the oscillating member. With such an arrangement, the distribution member will not have a uniform rate of oscillation, but will have a zero velocity for periods at the extreme position of oscillation of the member when the member is reversing direction, and will have a maximum velocity when the member passes through the position intermediate the extremes.

In some instances, it will be preferable to employ a hydraulic piston-type of drive means, whereby it is possible to impart a substantially uniform velocity to the oscillating member, with an essentially instantaneous reversal of direction. The variation from linear movement which is impressed upon material passing through the oscillation member by such a drive means can be described as saw-tooth. Additional variation in the design of the sheet material produced can also be achieved with a piston-type drive means by providing it with an unequal cycle, that is, with a forward stroke which is faster or slower than the reverse or recovery stroke, and thereby producing a change in the slope of the saw-tooth. Merely varying the speed of oscillation with all other elements being the same will produce variations in the patterns.

As described above, additional variation can be achieved in the sheets made in accordance with the present invention by providing a diversion sleeve within the second chamber which may also vary in contour along the width of the layers. Numerous other modifications in the apparatus and procedure employed will occur to those who are skilled in the art; such modifications are intended to be within the scope of the present invention.

The present invention is advantageously employed with various synthetic thermoplastic materials such as cellulose acetate and cellulose acetate-butyrate, polycarbonate, polyvinyl chloride, etc. Various dyes and pigments may be used to provide color or varying density of coloration to one or both plastic streams to achieve the visual differentiation in color, refraction or transparency in the differentially colored bands. Leafing flakes and pearl materials may also be employed.

Brief description of the drawings

FIG. 1 is a fragmentary end view of one embodiment of a multilayered stream of molten synthetic plastic formed as a step in the present invention;

FIG. 2 is a fragmentary plan view of one embodiment of an extruder assembly utilized in the present invention;

FIG. 3 is a side sectional view to an enlarged scale of the main die block of the assembly of FIG. 2;

FIG. 4 is a plan view of a spacing element in the color distributing stack of the main die block assembly of FIG. 3;

FIG. 5 is a plan view of a flow element in the color distributing stack thereof;

FIG. 6 is a plan view of another flow element in the color distributing stack thereof;

FIG. 16 is a fragmentary perspective view of one embodiment of synthetic plastic sheet material produced in accordance with the present invention;

FIG. 17 is a perspective view of a spectacle frame element produced from the sheet material of FIG. 16;

FIG. 18 is a fragmentary perspective view of another embodiment of synthetic plastic sheet material produced in accordance with the present invention;

FIG. 19 is a perspective view of a spectacle frame element produced from the sheet material of FIG. 18; and FIG. 20 is an end view of another embodiment of a multilayered synthetic plastic stream which may be formed as a step in the present invention.

Description of the preferred embodiments

Figure 7:
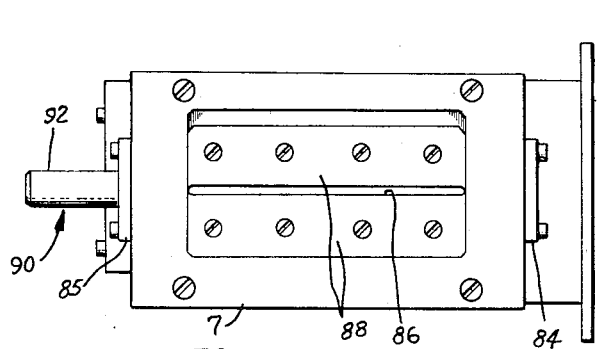
FIG. 7 is a front elevational view of the die block assembly of FIG. 2.

Referring now in detail to FIG. 1 of the attached drawings, there is fragmentarily illustrated in end view a synthetic plastic stream formed as a step of the present invention comprised of a plurality of layers 2 of a first color and layers 4 alternating therewith of a differentially colored material.

Referring next to FIGS. 2 and 3, therein illustrated is apparatus for forming the stream of FIG. 1. Referring in particular to FIG. 2, an extruder assembly embodying the present invention is generally comprised of a die block assembly generally designated by the numeral 6, a first extruder and conduit assembly generally designated by the numeral 8 and a second extruder and conduit assembly generally designated by the numeral 10. The die block assembly 6 includes a main die block 7 and a secondary die block 9.

The mainstream of plastic material to supply one of the layers 2, 4 is fed into the extrusion die assembly through the mainstream duct portion 12 of the extruder and conduit assembly 8. Before entering the duct portion 12, the plastic material passes through the heating section 14 of the conduit which is coupled to the intake section 16 by the collar assembly 18. To supply and melt the plastic material a conventional extruder is provided wherein a motor 20 drives the feed screw 22 to draw synthetic plastic pellets 24 stored in the hopper 26 through the heating section 14 of the conduit wherein a series of heating elements 28 melts the pellets 24 into a fluid stream of synthetic thermoplastic material.

A stream of fluid synthetic thermoplastic material for the other of the layers 2, 4 is supplied to the extrusion die assembly 6 by the second extruder and conduit assembly 10 wherein the conduit similarly includes a heating section 30 wherein the heating elements 32 melt the pellets 34 in the hopper 36 to provide a fluid stream of synthetic thermoplastic material as they are moved along by the screw 38. The intake section 40 is coupled to the heating section 30 through the collar assembly 42 and has a tubular portion 44 extending across the die assembly 6 which is locked within the die assembly by the flanged cap 46.

Referring next to FIG. 3, it can be seen that the main die block 7 has an elongated chamber 48 therein with a generally rectangular portion tapering to a reduced thickness adjacent an elongated orifice 50. The tubular portion 44 is disposed above the chamber 48 and the mainstream duct portion 12 fans out to an increased width and extends below the chamber 48.

Seated and locked within the chamber 48 is a color distributing stack generally designated by the numeral 54 which is comprised of alternately disposed plate-like flow elements 56, 58 separated by plate-like spacer elements 60. Extending downwardly from the tubular portion 44 of the extruder and conduit assembly 10 are a plurality of conduit portions 62 which communicate with manifolds or flow paths through the color distributing stack 54 defined by aligned apertures 64 in the flow elements 56, 58 and spacer elements 60. Extending upwardly from the mainstream duct portion 12 are a plurality of conduit portions 66 which communicate with manifolds defined by the apertures 68 in the flow elements 56, 58 and spacer elements 60 and best seen in FIGS. 4–6. As can be seen, the manifolds defined by apertures 64, 68 alternate so as to provide adjacent flow paths for material from the two conduit assemblies 8, 10.

The apertures 64 in the flow elements 56 are notched outwardly so that the apertures expand and the adjacent sides thereof converge toward the extrusion die orifice 50 to provide expanding paths for the synthetic plastic material flowing therethrough from the manifolds communicating with the tubular portion 44 of the conduit assembly 10. The apertures 68 in the flow elements 58 are similarly notched outwardly to provide expanding paths for synthetic plastic material flowing therethrough from the manifolds communicating with the mainstream duct portion 12. It can be seen that the expanding apertures in the flow elements 56, 58 alternate across the width of the color distributing stack. The flow elements 56, 58 and spacer elements 60 are pinned together in a stack against relative displacement by elongated fasteners 70 seated in the apertures 72 of the members 56, 58 and 60.

Thus, in operation of this particular embodiment, molten material of a first color from the extruder and conduit assembly 10 enters into the extrusion die assembly 6 through the tubular portion 44, and passes downwardly through the conduit portions 62 into the manifolds 64 of the color distributing stack 54. As it flows through the flow elements 56, it is allowed to flow outwardly through the notched-out apertures between the spacer elements 60. Similarly, differentially colored molten thermoplastic material from the extruder and conduit assembly 8 flows into the mainstream duct portion 12 and upwardly through the conduit portions 66 into the manifolds 68 in the color distributing stack 54. As it flows through the flow elements 58, it is permitted to flow outwardly in the notched-out portions between the spacer elements 60. As the streams of material flowing within the notched-out apertures of the flow elements 56, 58 pass outwardly of the spacer elements 60, they combine into a multilayered stream with alternating layers of differentially colored material. This stream is then directed by the configuration of the extrusion chamber 48 to the orifice 50 wherein its configuration is established in terms of width and thickness, to produce a stream substantially as illustrated in FIG. 1.

Figure 8:
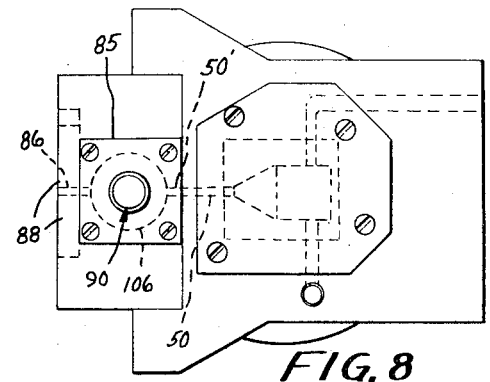
FIG. 8 is a side elevational view thereof.

Turning now to FIGS. 7 and 8, the secondary die block 9 is mounted at the front of the main die block 7 and rotatably supports a distribution member generally designated by the numeral 90 in end plates 84, 85 with the drive portion or spindle end 92 extending outwardly therefrom for coupling to suitable drive means. The secondary die block 9 has a generally cylindrical chamber 106 therein which communicates with the first chamber 48 of the main die block through a narrow passage and orifice 50' aligned with the orifice 50 of the main die block 7. A second passageway extends therefrom to the discharge orifice 86 defined by the die lips 88.

Figure 9:
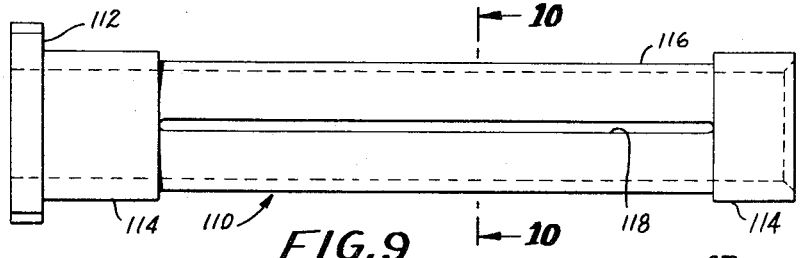
FIG. 9 is a front elevational view of a diversion sleeve in the secondary die block assembly of FIG. 7.
Figure 10:
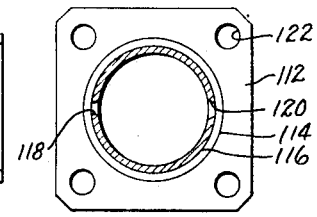
FIG. 10 is a sectional view of the diversion sleeve of FIG. 9 along the line 10—10.

Stationary within the die chamber 106 is a diversion sleeve generally indicated by the numeral 110 and best seen in FIGS. 9 and 10. The sleeve 110 has end portions 114 of greater diameter than the cylindrical body portion 116 which has elongated outlet and inlet apertures 118, 120 extending axially therealong. At one end portion 114 is a mounting plate 112 with apertures 122 therein for mounting of the sleeve in the die block 9.

Figure 11:
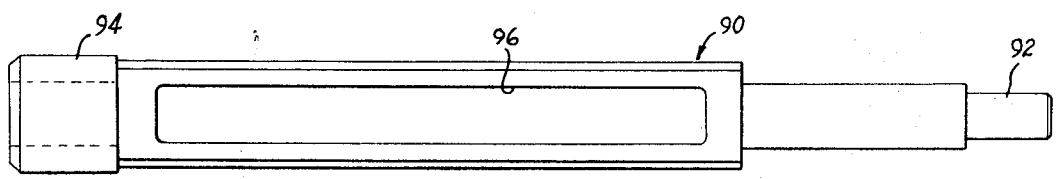
FIG. 11 is a front elevational view of one embodiment of a distribution member for the secondary die block assembly.

Rotatably seated within the diversion sleeve 110 is the distribution member 90 which is best seen in FIG. 11. At one end thereof is a bushing 94 to facilitate oscillation thereof and a second bushing is provided in the end plate 85 so as to facilitate changing of the elements. The distribution member 90 has an elongated aperture or flow passage 96 through which the stream of molten material passes.

Figure 12:
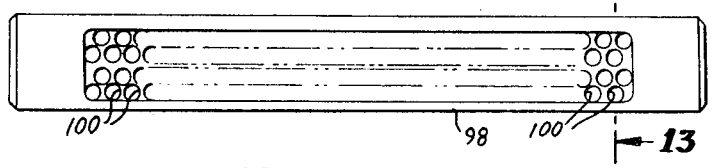
FIG. 12 is a front elevational view of one embodiment of a die insert for the distribution member of FIG. 11.
Figure 13:
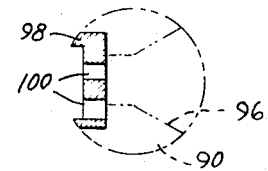
FIG. 13 is a sectional view of the die insert of FIG. 12 along the line 13—13, with the distribution member of FIG. 11 shown in phantom.
Figure 14:
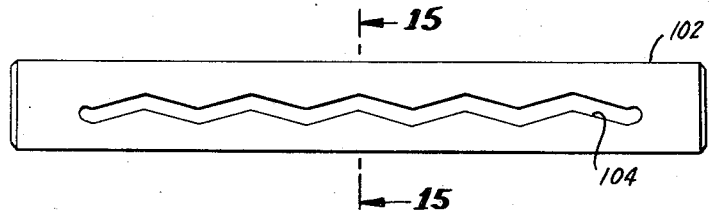
FIG. 14 is a front elevational view of another embodiment of a die insert for the distribution member of FIG. 11.
Figure 15:
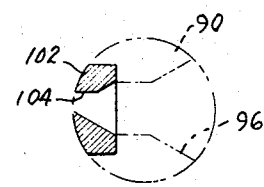
FIG. 15 is a sectional view of the die insert of FIG. 14 along the line 15—15, with the interior of the distribution member shown in phantom.

Although mere oscillation of the distribution member 90 to vary the flow path therethrough and displace the layers relative to the outlet orifice 118 in the sleeve 110 will produce desirable effects, die inserts are advantageously included therewith to effect the flow and distribution of the layers by reason of their length and configuration. Two embodiments of die inserts are shown in FIGS. 12 and 13 and FIGS. 14 and 15. In FIGS. 12 and 13 the die insert 98 of the embodiment has a multiplicity of round apertures 100 spaced both axially and perpendicular thereto as well as being staggered in the latter direction. The funnel-shaped configuration of the flow passage 96 in the distribution member 90 is illustrated in phantom line in FIG. 12. In the embodiment of FIGS. 14 and 15, the die insert 102 has a serrated or saw-toothed aperture 104.

A composite sheet material having an intermediate portion with differentially colored bands encapsulated within outside layers of substantially uniform coloration is prepared, with reference to FIGS. 7–15, by forming a multilayered composite stream in chamber 48 which flows through the orifices or passages into the chamber 106. Herein, the composite stream encounters the diversion sleeve 110 which allows the central portion of the stream to flow through the inlet opening 120 and diverts the outer layers along the outer surface of its body portion 116. The portion of the composite stream which passes through the inlet opening 120 flows through the passage 96 in the distribution element 90, and is then forced through the apertures 100, 104, depending upon whether the die insert 98 or 102 is utilized. After passing through the die face apertures, the material passes through the outlet opening 118 in the diversion sleeve 110 and is encapsulated by the portions of material flowing about the body portion 116. As a result of the influence of the oscillatory motion, and the apertures in the die insert, portions of the layered material are displaced in the direction of rotation with respect to the portion of material which immediately preceded them to form nonrectilinear bands of color. After rejoining the diverted portions, the composite stream of variegated material encapsulated within substantially uniformly colored material passes through the discharge orifice 86 of the chamber 106 between the extrusion die lips 88 to produce the desired composite sheet material.

Sheet material of the type produced in accordance with the present invention is illustrated in FIGS. 16 and 18, and spectacle frames produced therefrom are seen in FIGS. 17 and 19. By use of the diversion sleeve, the sheet material 132 has monochromatic outer surface layers 134 and bands or swirls of differential color extending throughout the body of the sheet material. The "peacock" type of pattern is attained by use of the die insert 98 with its multiplicity of round apertures 100.

In FIG. 17 the spectacle frame element 136 prepared from the sheet material 132 is shown. The cross-sectional surface of the sheet material is illustrated by the area designated 137 and the monochromatic outside layer is indicated by the numeral 138. By bevelling or tapering the side surfaces, the cross-sectional pattern is exposed at varying angles with resultant variation in visual pattern as seen at 139.

The sheet material 140 of FIG. 18 is formed from a composite stream such as that illustrated in FIG. 20 wherein the center portion is unlayered and of a single color 142 but both sides are multilayered of the same color 142 and a second color 144. By use of a diversion sleeve, the outer surfaces 146 of the sheet material 140 are monochromatic. The nonlinear bands in this embodiment are formed by the die insert 102 with its serrated aperture 104.

When the spectacle frame 148 is blanked therefrom, the planar surfaces 150 are of a single color and the cross-sectional surface 152 at the bridge portion 154 is of the same color. However, the bevelled side surfaces 156 at the side portions 158 of the frame display the interesting cross-sectional multicolored patterns.

By removing the encapsulating surface portions of the sheet material parallel to the surface, multicolored patterns are observable in the longitudinal or extension direction although not generally of as much import as those obtained by surfaces at an angle thereto. Since the layers formed in the first chamber may include bands of color in the outer surface portions, even the encapsulating surfaces may employ differentially colored bands extending longitudinally of the sheet material.

Although a die block may be so fabricated as to provide both the first and second chambers and the desired orifices, generally it is preferable to fabricate a main die block providing the first chamber and the passages leading to and from such chamber and to then fabricate a secondary die block which provides the second chamber and its associated passages or orifices. The two die blocks may then be secured together in any convenient fashion. Generally, the die blocks are fabricated in at least two pieces so as to facilitate cleaning, insertion of the several elements and machining the interior chambers and passages. In addition, the die lips defining the discharge orifices from the secondary die block or second chamber are desirably fabricated as separate elements so that they may be interchanged to vary the thickness of the sheet material thus produced.

Accordingly, it can be seen that the present invention provides novel and attractive synthetic plastic sheet material having bands of differentially colored material which are nonrectilinear in the length and depth dimension of the sheet material and which may also be nonrectilinear or nonuniform in the width dimension of the sheet material. If so desired, the surface layers of the sheet material may be monochromatic or may have undisturbed rectilinear bands of color extending therealong. Wide variations in the visual pattern thus formed are possible through variation in the number of layers utilized, the location and depth of the layers, the speed and means of displacement of the distribution member, the orifices in the distribution member, etc. This sheet material may be produced by apparatus which is relatively simple and rugged in construction and which permits a wide variation in design through interchangeability of the elements. By varying angular disposition of side surfaces to the planar surfaces of the sheet material, the patterns seen by an observer may be altered with a given sheet material, thus facilitating great versatility in design.

Having thus described the invention, I claim:

1. An extrusion die assembly for fabricating synthetic thermoplastic sheet material having differentially colored bands therein comprising a die block with a first chamber and a second chamber communicating therewith through an intermediate orifice having a first and second dimension, said first chamber having means therein for receiving a plurality of differentially colored streams of fluid synthetic thermoplastic material and for forming a composite stream of fluid synthetic thermoplastic material having a multiplicity of differentially colored layers disposed in planes substantially parallel to the first dimension of said intermediate orifice, said second chamber communicating with a discharge orifice for passage therethrough of a composite stream of fluid synthetic thermoplastic material from said first chamber; a distribution member in said second chamber between said intermediate and discharge orifices, said distribution member having a flow passage therethrough from adjacent said intermediate orifice to adjacent said discharge orifice to pass at least a portion of the composite stream therethrough; means mounting said distribution member for oscillating motion in the direction of the second dimension of said intermediate orifice; and drive means for oscillating said distribution member to displace portions of the composite stream of fluid synthetic material in a direction substantially perpendicular to said first dimension.

2. The extrusion die assembly of claim 1 wherein said distribution member has a distribution portion within said second chamber of said die block and a drive portion for transmission of motion from said drive means outwardly of said die block, said distribution portion having said flow passage therethrough terminating at a die face.

3. The extrusion die assembly of claim 2 wherein said die face is provided by a die insert removably mounted in said distribution member and having at least one shaped aperture therein defining the discharge end of said flow passage therethrough.

4. The extrusion die assembly of claim 1 wherein said flow passage through said distribution member terminates in an elongated aperture of generally saw-toothed configuration dimensioned to include a plurality of layers of the composite stream.

5. The extrusion die assembly of claim 1 wherein said flow passage through said distribution member terminates in a multiplicity of apertures spaced in both said first and said second dimensions of said intermediate orifice to receive a plurality of layers of the composite stream.

6. The extrusion die assembly of claim 1 wherein said distribution member passage has a portion of generally funnel-shaped cross-section which opens toward said intermediate orifice.

7. The extrusion die assembly of claim 1 wherein said extrusion die assembly includes a diversion sleeve in said second chamber about said distribution member, said diversion sleeve being spaced from the wall of said second chamber in the direction of said second dimension of said intermediate orifice and from said intermediate orifice to provide for flow of an outer portion of the composite stream entering the said second chamber about said diversion sleeve and said distribution member, whereby the diverted outer portion is substantially undisturbed and reunites with the portion of the composite stream passing through said distribution member to provide a surface layer therefor.

8. The extrusion die assembly of claim 7 wherein said diversion sleeve is spaced from said second chamber wall so as to provide for diversion of opposite surface portions of the composite stream about opposite surfaces thereof and of said distribution member so as to encapsulate the portion of the composite stream passing through the distribution member within diverted surface portions.

9. The extrusion die assembly of claim 1 wherein said extrusion die assembly includes a diversion sleeve in said second chamber extending about said distribution member and providing a spacing between its outer surface and the wall of said second chamber in the direction of the second dimension of said intermediate orifice to provide for flow of opposite outer portions of the composite stream about opposite surfaces thereof and of said distribution member so as to encapsulate the portion of the composite stream passing through the distribution member within the diverted surface portions upon reuniting of the diverted portions with the portion passing through the distribution member, said sleeve having a passage therethrough cooperating with the flow passage in said distribution member, said distribution member having a distribution portion within said sleeve and a drive portion for transmission of power from said drive means outwardly of said die block.

10. An extrusion die assembly for fabricating synthetic thermoplastic sheet material having differentially colored bands therein comprising: a die block with a first chamber and a second chamber communicating therewith through an intermediate orifice having major and minor dimensions, said first chamber having means therein for receiving a plurality of differentially colored streams of fluid synthetic thermoplastic material and for forming a composite stream of fluid synthetic thermoplastic material having a multiplicity of differentially colored layers disposed in planes substantially parallel to the major dimension of said intermediate orifice, said second chamber being of substantially circular cross-section and communicating with a discharge orifice from said die block for passage therethrough of a composite stream of fluid synthetic thermoplastic material from said first chamber; a generally cylindrical diversion sleeve in said second chamber of lesser diameter than said second chamber so as to provide a substantially annular spacing therebetween, said sleeve having a passage therethrough from adjacent said intermediate orifice to adjacent said discharge orifice; a distribution member oscillatable in said diversion sleeve and having a flow passage therethrough cooperating with the passage in said diversion sleeve to pass a portion of the composite stream therethrough with outer surface portions of the composite stream being diverted about said diversion sleeve and reuniting with and encapsulating the portion of the stream passing through said distribution member prior to said discharge orifice; and drive means for oscillating said distribution member in the direction of said minor dimension so as to displace portions of the composite stream of fluid synthetic material passing therethrough in a direction substantially perpendicular to said major dimension of said intermediate orifice and produce a composite stream having differentially colored bands oscillating in said minor dimension along the length of the composite stream.

11. The extrusion die assembly of claim 10 wherein said flow passage through said distribution member terminates in an elongated aperture of generally saw-toothed configuration dimensioned to include a plurality of layers of the composite stream.

12. The extrusion die assembly of claim 10 wherein said flow passage through said distribution member terminates in a multiplicity of apertures spaced in both said major and minor dimensions of said intermediate orifice to receive a plurality of layers of the composite stream.

References Cited
UNITED STATES PATENTS

| | | | |
|---|---|---|---|
| Re. 26,237 | 7/1967 | Rowland | 18—13 X |
| 1,730,673 | 10/1929 | Mell. | |
| 2,573,050 | 10/1951 | Orsini. | |
| 2,632,204 | 3/1953 | Murray | 18—13 |
| 2,803,041 | 8/1957 | Hill et al. | 18—13 X |
| 3,274,646 | 9/1966 | Krystof | 18—13 |
| 3,422,175 | 1/1969 | Rowland | 18—13 X |
| 3,443,278 | 5/1969 | Nauta | 18—13 |

J. SPENCER OVERHOLSER, Primary Examiner

M. O. SUTTON, Assistant Examiner

U.S. Cl. X.R.

264—75